United States Patent
Flockhart et al.

(10) Patent No.: US 8,699,695 B2
(45) Date of Patent: Apr. 15, 2014

(54) AUTOMATIC CALL NOTIFICATION GROUPS

(71) Applicant: Avaya Inc., Basking Ridge, NJ (US)

(72) Inventors: Andrew D. Flockhart, Thornton, CO (US); Robert C. Steiner, Broomfield, CO (US); Joylee Kohler, Colorado Springs, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/622,525

(22) Filed: Sep. 19, 2012

(65) Prior Publication Data

US 2014/0079209 A1    Mar. 20, 2014

(51) Int. Cl.
*H04M 3/00* (2006.01)
*H04M 5/00* (2006.01)

(52) U.S. Cl.
USPC ............ 379/265.11; 379/265.02; 379/265.05; 379/265.09; 379/265.12

(58) Field of Classification Search
USPC ............ 379/265.09, 265.12, 265.05, 265.01, 379/265.02; 705/1, 9
See application file for complete search history.

(56) References Cited

U.S. PATENT DOCUMENTS

| | | | |
|---|---|---|---|
| 7,343,406 B1 | 3/2008 | Buonanno et al. | |
| 2008/0120125 A1* | 5/2008 | Chavez | 705/1 |
| 2008/0120164 A1* | 5/2008 | Hassler | 705/9 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |

\* cited by examiner

*Primary Examiner* — Thjuan K Addy
(74) *Attorney, Agent, or Firm* — Sheridan Ross P.C.

(57) ABSTRACT

A contact center is provided that pushes notifications to one or more resources about available work item opportunities. The one or more resources can pull the work item from the notification groups to handle the work item. Moreover, the pushed notifications can be added to a traditional work assignment scheme to aid in the answering of work items and/or offer training to a plurality of resources.

21 Claims, 6 Drawing Sheets

AUTOMATIC CALL NOTIFICATION GROUPS

FIELD OF THE DISCLOSURE

The present disclosure is generally directed toward communications and more specifically toward contact centers.

BACKGROUND

Contact centers can provide numerous services to customers, and have been doing so for years. The idea of a contact center queue is not much different from that of standing in line at a bank and waiting to be helped by the next available teller. However, there can be a lot of frustration if the first, second, or even third teller cannot answer a given question or set of questions. The same frustrations have been known to occur in contact centers. A company can gain customer satisfaction if they are able to answer their customers' questions quickly and accurately.

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts.

As products and problems become more complex and diverse in nature, a single agent often lacks the skills or expertise to fully service customer contacts. To service customer contacts more effectively, the contact center may route contacts to one or more resources with specific skills and attributes. For example, contact centers that handle computer customer service may have application resources, hardware resources, operating system resources, network resources, etc. While these resources may be well-qualified to answer questions on their particular subject(s), they are often unqualified to answer questions involving subjects outside of their respective skill sets.

Currently, resources may be assigned work based on a number of factors. These factors may include, but are not limited to resource availability, agent training and/or skill, contact center state, contact type, and more. It is one goal of a contact center to maintain good customer service when handling contacts, and as such, many mechanisms have been developed to best distribute work to qualified agents in a timely and efficient manner. However, in some cases contacts may not be assigned to the most qualified agent or resource, especially with skill-specific contacts or high-demand contact center states. For example, although a particular resource may have a busy schedule with a constant workflow, that resource may wish to handle additional contacts if given the choice to do so. Unfortunately, the resource may not be assigned additional contacts through traditional workflow assignment techniques. Without a notification of available additional contacts, the resource does not even know that they exist.

In addition, training more agents in specific skill sets, (e.g., those skills that are in high demand) may also satisfy a contact center's goal of efficiently handling contacts. Currently, the training of agents is a very organized, formal, and scheduled process. As can be appreciated, there are various problems associated with scheduled training sessions. For instance, many of the best training scenarios involve real contacts serviced by a qualified agent, where an agent-in-training can observe, and in some cases even participate, with the real contacts. Unfortunately, the contacts that may present decent training opportunities are not discovered until after the contact has been routed to an agent.

In any event, work is typically assigned by a mechanism and little latitude is given to an agent or resource in selecting when to handle a contact. More specifically, when a work assignment decision is made for a work item associated with the contact, the contact is directed to an appropriate agent and/or group without prior acceptance by the agent and/or group.

SUMMARY

It is with respect to the above issues and other problems that the embodiments presented herein were contemplated. In particular, embodiments of the present disclosure provide methods, devices, and systems to automatically push notifications to one or more groups of available contacts. Additionally, each group may comprise one or more contact center resource, where the resource may accept, deny, and/or ignore the notification. In some embodiments, if a resource accepts the notification, the contact is then assigned and routed to the accepting agent.

Embodiments of the present disclosure may send at least one notification of a received contact/work item to a group of one or more resources, wherein one or more of the resources may decide to handle the work item by accepting the work item based on the push notification. This notification may be pushed to at least one group, and the work item may be "pulled" from the work queue by a resource of the at least one group after accepting the notification of work. In other words, a resource in a group may choose to accept, ignore, and/or deny the notification of work.

It is anticipated that the groups and/or resources may be classified into different types. For instance, groups and/or resources may be classified at least as dedicated and/or non-dedicated types. In some embodiments, the dedicated groups may include regular agents who register for notifications and/or work. In some embodiments, the non-dedicated groups may include agents who may receive notifications, but are not necessarily required to register for work. However, it is anticipated that some non-dedicated agents may register once and that registration may be acceptable for a specific time period after registration. By allowing non-dedicated agents to accept notifications and work items without registering, the level of required input from a non-dedicated agent is dramatically decreased and the ease of participating in the automatic call notification groups is made more convenient.

This disclosure is especially relevant for professionals (e.g., those in the medical field who interact with patients and/or clients) and/or small businesses. For example, doctors, nurses, physician's assistants, and other medical professionals may receive numerous contacts from patients who may require an immediate response. Unfortunately, medical professionals are constantly busy and have little time to handle scheduled calls or contacts. In some embodiments, the present disclosure provides a contact notification system where these busy professionals may be alerted (individually or as part of a group) of an available contact, but are not required to answer the notification.

Generally, more than one resource will be notified of an available contact via the pushed notification. Accordingly, if a contact notification is not answered by one specific resource, the contact is not lost because other resources have been notified and may handle the contact. Additionally, or alternatively, a group may be defined as a single resource or agent. In some instances, nurses may be considered as non-dedicated agents, and a specific doctor may be considered a dedicated agent. However, the opposite may apply depending on the configuration of a certain group.

Moreover, although the professionals in a field may be busy, it is expected that a contact may be answered in the times when the professionals are between scheduled appointments and/or contacts. In other words, the professionals may decide to answer one or more contacts during their breaks in the day based on the pushed notification.

It is anticipated that Automatic Call Notification Groups may utilize several mechanisms in selecting groups to receive notifications. For instance, the notification may be pushed to agents and/or resources associated with specific skill sets, training, and/or subject matter proficiencies. Moreover, a resident expert or other agent may register for notifications of available contacts (as a dedicated agent). In some embodiments, the notifications may be used to alert multiple agents for the purpose of teamed training. In the event of a teamed training scenario, the work item may be assigned to at least one resource and then still be sent to a notification group to include others in a training opportunity. It is one aspect of the present invention that a work item may be directed based on the work item type and/or whether the call is answered by a regular agent. Additionally, or alternatively, a notification may be pushed to one or more groups in addition to queuing the work item for regular work assignment. In the event that the work item is pulled by a notified available group member, the work item may also be pulled from a work assignment queue. In one embodiment, the notification may be pushed to one or more resources based on a state or a busyness associated with the one or more resources. In one example, if one or more resources are determined to be "busy" the notification may be pushed to another resource, or resources, who are not "busy." Additionally, or alternatively, various states associated with resources may be used to determine which resources may receive the pushed notifications. As can be appreciated, the state may be used to prevent, induce, or otherwise not affect determining to push notifications.

In some embodiments, the notifications may be sent in response to other agents requiring assistance. Additionally, or alternatively, the notifications may be sent at any time and/or for any reason. Moreover, the notifications may alert an agent or group by visual means, audible means, tactile means, and/or combinations thereof. For instance, a light may flash on a phone, device, computer, and the like. In other embodiments, it is anticipated that the notification may appear in a visual text-based format, where the text describes the nature of the work item associated with the notification. The notification may be configured to indicate how "well-matched" a work item is to a group and/or agent. For example, an indicator light may flash at a higher rate of speed if the work item is well-matched to a particular agent and/or group. Additionally, or alternatively, the notification may describe how well-matched a work item is by stating it in text, audible, or other alert. In one embodiment it is anticipated that a resource may accept, deny, and/or ignore a pushed notification via an interactive alert.

In accordance with embodiments of the present disclosure, it is anticipated that special functions may be used to determine whether to push a notification. In some cases presence associated with an agent and/or group may be used to determine whether a notification should be sent. Moreover, a work item may be routed to a specific agent, whether dedicated or non-dedicated, if it is determined that the work item is urgent or critical for a specific resource. This functionality may be implemented by flagging specific work items by scouring, or analyzing, the work items for keywords and/or criteria before sending the notifications.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
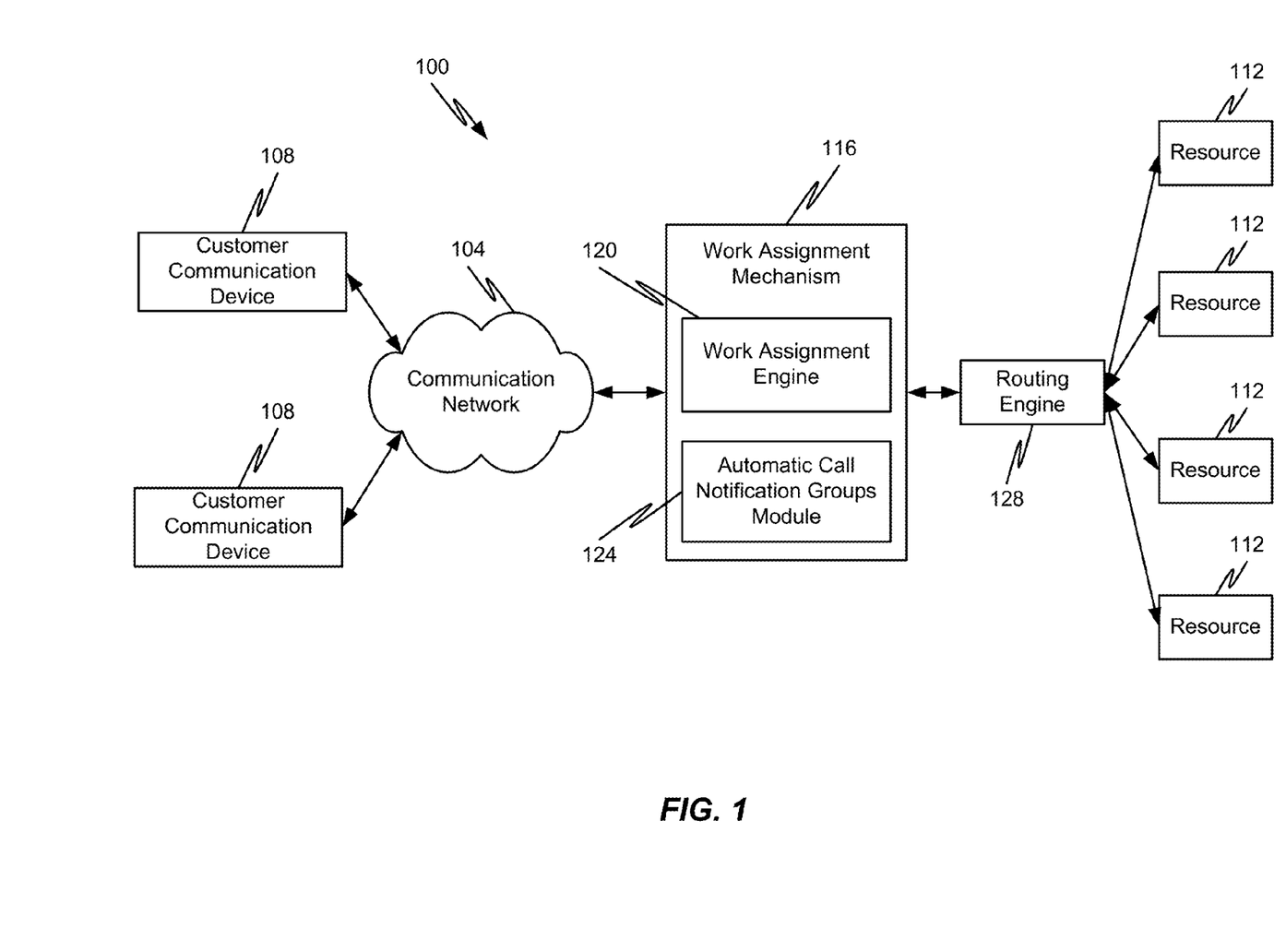
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center of work to be performed in connection with servicing a communication received at the contact center (and more specifically the work assignment mechanism 116).

The communication associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 128 to connect the communication device 108 which initiated the communication with the assigned resource 112. In some embodiments, the routing engine 128 may send a notification to one or more resources 112 before the work assignment engine 120 routes the work item.

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128.

The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is eligible and/or qualified to receive a work item and further determine which of the plurality of processing resources 112 is best suited to handle the processing needs of the work item. In situations of work item surplus, the work assignment engine 120 can also make the opposite determination (i.e., determine optimal assignment of a work item to a resource). In some embodiments, the work assignment engine 120 is configured to achieve true one-to-one matching.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 120, the work assignment mechanism 116 may also comprise an automatic call notification groups ("ACNG") module 124. As discussed above, the ACNG module 124 may be configured to push notifications regarding one or more available work items to one or more resources 112 before the work assignment engine 120 assigns the work item associated with the contact to a resource 112. In some embodiments, the ACNG module 124 may push notifications to one or more resources 112 based on presence information associated with the one or more resources 112.

In some embodiments, the notifications may be pushed based on an analysis of a received work item. As can be appreciated, the analysis of a received work item may be performed automatically via the ACNG module 124, and/or manually via a resource 112. Among other things, the analysis of a received contact may compare information relating to the contact and/or resource 112 to push notification rules stored in memory. For example, the information relating to the contact may include, but is not limited to, a customer value, subject matter, urgency, requested resource, and a workflow status. It is anticipated that rules stored in memory may determine how to direct or route a contact, and whether to initiate a push notification, based on this contact information. Additionally, or alternatively, the resource 112 may be a trainee-agent, a trainer-agent, and/or an agent requesting assistance. In this case, the ACNG module 124 may automatically initiate push notifications to one or more resources 112. Alternatively, a first resource 112 (e.g., an agent that is processing a work item and needs assistance from other resources) may instruct the ACNG module 124 to push the notifications to other resources 112.

In some embodiments, routing provided by the routing engine 128 may be affected by direction provided by at least one of the work assignment mechanism 116, the work assignment engine 120, and the ACNG module 124. This direction may include input relative to resource 112 type, group type, customer identification, and the like. For instance, the ACNG module 124 may instruct the routing engine to push notifications to one or more resources 112 before assignments are made by the work assignment engine 120. In this case, push notifications may be sent to registered and/or unregistered resources 112. In one embodiment, the one or more resources 112 may handle the work item by accepting a received push notification.

Figure 2:
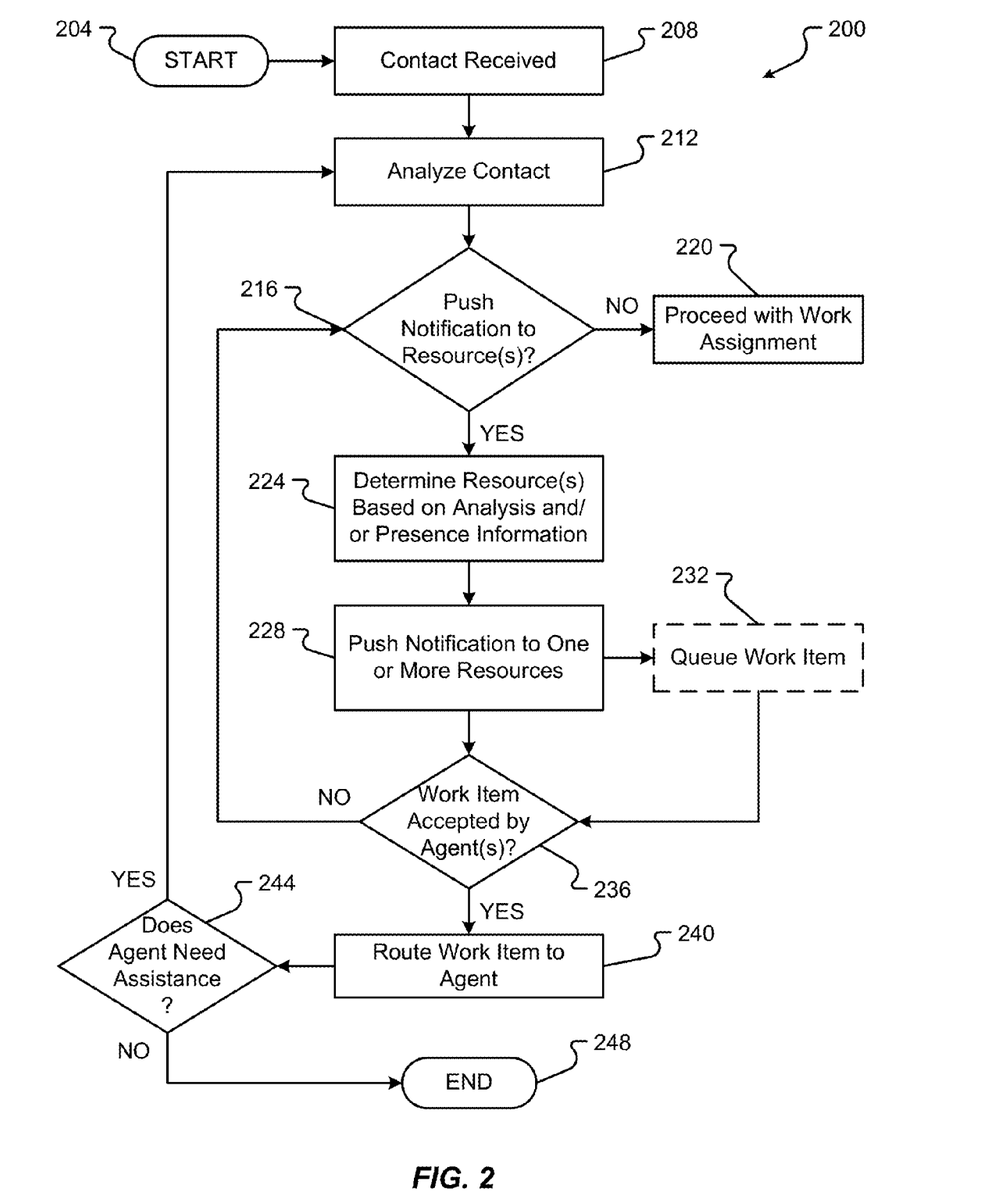
FIG. 2 is a first flow diagram depicting a method of automatically pushing call notifications in accordance with embodiments of the present disclosure.

Referring now to FIG. 2, a first flow diagram is provided in accordance with embodiments of the present disclosure depicting a method 200 of automatically pushing call notifications to one or more resource 112. The method 200 begins at step 204 and proceeds when a contact item is received by the work assignment mechanism 116 of a contact center (step 208). Next, the contact may be analyzed for information relating to the work item type and other information that may be used to aid in the efficient routing within at least one workflow (step 212). This analysis may be performed by the work assignment mechanism 116, through its various components (e.g., the work assignment engine 120 and the ACNG module 124, etc.). Categories of information relating to the contact may include, but is not limited to, subject matter, urgency level, customer grade or level, requested resource(s), and workflow status, to name a few. Although the work assignment mechanism 116 itself may perform this analysis, it is anticipated that the work assignment mechanism 116 may be configured to detect at least one identifier associated with one or more of the categories and route the contact to the work assignment engine 120 and/or the ACNG module 124 for further analysis. For example, a contact may be received that includes information identifying the contact at a medium level of urgency (rating at a "5" on a scale of "1 to 10," where a "1" is classified as not urgent and "10" is considered extremely urgent), and a customer grade or level marked as high (on a rating system from low to high, including ratings in between the outer limits). In this case, the work assignment mechanism 116 may direct the contact to the work assignment engine 120 for further analysis in determining routing and/or queuing, and may simultaneously direct the contact to the ACNG module 124 for analysis regarding automatic call notification groups.

In accordance with embodiments of the present disclosure, it is anticipated that the categories of information and other information related to a contact may be provided via manual input, automated processes, and/or combinations thereof. In one embodiment, the manual input may be provided by a customer who is requesting a resource. This manual input may be provided in response to one or more human agent and automated resource (e.g., IVR) prompts. Additionally, or alternatively, the work assignment mechanism 116, upon receiving a contact, may automatically determine the contact source (via IP address, MAC address, and the like), associations, type, and customer. This data may be used to further determine prior contacts, historical data, customer quality levels, languages, geographic resources, and the like.

The method 200 continues by determining whether to push the contact to notification groups (step 216). As described above, each received contact is analyzed for pertinent category information to aid in routing, queuing, and/or creating pushed notifications. Among other things, the ACNG module 124 may automatically determine, based at least partially on the contact analysis (performed at step 212), to push a notification of the contact to one or more resources 112. In some cases, the ACNG module 124 may determine to push a notification of the contact to a single resource 112. In some embodiments, it may be beneficial to classify one or more resources 112 as a group. As such, the ACNG module 124 need only refer to the "group" identifier to determine appropriate notification recipients. In some embodiments, the ACNG module 124 may determine to push notifications to more than one group. As can be expected, the determination may be made from information relating to the one or more categories previously disclosed. In the event that the ACNG module 124 determines not to push the work item associated with the contact to one or more resources 112, the method 200 may continue by proceeding with a work assignment of the work item (step 220). This work assignment may include any number of mechanisms to route, queue, and/or direct work to one or more resources 112.

The method 200 may determine current contact center conditions that the ACNG module 124 may refer to in deciding whether or not to push contact notifications to one or more resources 112 (step 216). In some embodiments, it may be deemed important to adjust an amount of pushed notifications based on contact center conditions. For example, in the event of an emergency, the contact center conditions surrounding the emergency may prompt the ACNG module 124 to adjust an amount of pushed notifications to higher levels (than ordinarily determined) to accommodate the increase in demand. Conversely, at times of low contact center traffic, the contact center conditions may prompt the ACNG module 124 to minimize the number of pushed notifications. Alternatively, it may be deemed that work items and contacts can be handled more efficiently during low traffic conditions by using the pushed notifications. As can be appreciated, the method 200 may be modified in various configurations to suit contact center and/or resource 112 allocation needs.

The method 200, upon determining to push the notification to one or more resources 112, may continue by determining the one or more resources 112 that will receive the pushed notification (step 224). This determination may be performed via the ACNG module 124. In general, one or more resources 112 may be associated with information (e.g., category information) detected during the contact analysis. As can be expected, the one or more resources 112 may be pushed notifications of a contact based on rules that match the analyzed information with corresponding, or best-suited, resource information. For example, a resource and/or group may be associated with, inter alia, handling a specific subject matter type. Upon detecting that a contact is associated with the specific subject matter type the ACNG module 124 may match the one or more resources 112 to the work item associated with the contact, such that the one or more resources 112 receive a pushed notification regarding that work item.

In some embodiments, the determination of which one or more resources 112 are to receive push notifications may be based on presence information. The presence information may relate to the presence of one or more resources 112, a group, a device, and combinations thereof. Presence may be provided via multiple methods and/or standards including but not limited to Session Initiation Protocol ("SIP"), Instant Message and Presence Protocol ("IMPP"), Extensible Messaging and Presence Protocol ("XMPP"), and the like. In some embodiments, the use of presence may be employed to alter an availability of one or more resources 112. Although presence is more than availability, it is anticipated that the presence of multiple resources 112, upon reaching a predetermined threshold may even be configured to alter a presence indication for the one or more resources 112. For example, if it is determined based on presence information that 70% of a plurality of resources 112 (e.g., a group) are unable to handle a work item, the plurality of resources 112 may be classified as "utilized." One or more resources 112 classified as "utilized" may be treated differently from other resources, especially when the ACNG module 124 is determining one or more resources 112 to push notifications. It should be appreciated that this threshold may be adjusted as deemed appropriate, automatically via historical data and/or manually via preference settings within the ACNG module 124. Classifying one or more resources 112 based on presence may be performed via the ACNG module 124 to, among other things, alter the amount of push notifications that the one or more resources 112 receives.

At step 228 the ACNG module 124 pushes the notification to the one or more resources 112 determined to receive notification. In pushing the notification, the ACNG module 124 may work with the routing engine 128 to reach the one or more resources 112. In some embodiments, the contact notification may be pushed to one or more resources 112 in accordance with rules stored in memory. These rules may determine the number of notifications to send, the type of notifications, alerts accompanying the notifications, and the like. For example, a notification may be sent to one or more resources 112 that includes an alert of the notification. In particular, a contact notification and alert may be sent to one or more devices associated with a resource 112, where the rules may include specific notification and/or alert behavior based on the one or more devices. In one embodiment, the notification and alert may be sent as a pop-up window in a computer program. The pop-up may employ sound, visual stimulus, and/or interactive selections to allow at least one recipient to accept, deny, and/or ignore the notification. In another embodiment, the notification and alert may be sent to a telephone. In this case, the ring characteristics may be altered to indicate various alert conditions. For instance, a notification and alert of an urgent contact may be configured to ring multiple times per second. Additionally, or alternatively, the notification rings may be configured to indicate a code relating to contact identification. In this case the ring may be configured to produce two tones in one second, pause for half a second, and repeat the two tones and pause routine. In any event, the notification and alert may be configured to provide information to one or more possible resources 112 and/or groups relating to the work item.

In one embodiment, the ACNG module 124 may determine that the work item can be queued and routed to a suitable agent and/or resource in accordance with other workflow processes (step 232). This queuing of a work item may be performed prior to, simultaneously with, or after notification of the contact/work item is pushed to notification groups. It is anticipated that a work item may be queued automatically via the ACNG module 124, work assignment engine 120, or other component of the work assignment mechanism 116. Additionally, or alternatively, a work item may be manually placed in queue via an agent, resource, customer, or combinations thereof.

The method 200 continues by detecting whether the work item has been accepted by one or more agents/resources 112 (step 236). In particular, the present disclosure describes that a notification of an available work item is pushed to one or more resources 112. In some embodiments, the one or more resources 112 may accept the work item for handling by accepting the notification. This process may involve a resource 112 accepting the notification, which creates an acceptance message that is sent back to and received by the ACNG module 124. The ACNG module 124 may then refer to rules regarding the number of resources 112 requested to handle the work item (and other contact-specific information), whether other resources 112 have accepted the notification, and any priorities that relate to the acceptance. Once the ACNG module 124 has referred to the appropriate rules, the work item may be routed to the one or more agents/resources 112 (step 240). In another embodiment, the ACNG module 124 may determine that a work item has been handled from a queued, or other, workflow as directed by step 232. In this case, the ACNG module 124 may proceed similarly as previously described. In yet another embodiment, the work item may be handled by one or more resource 112, by accepting the pushed notification and work item from the routing engine 128. In other words, the routing engine 128, upon direction received from the ACNG module 124, may route the notification along with the work item. When the notification is accepted by one or more resources 112 the work item is automatically accepted at the same time. This scenario is especially useful for a contact center architecture employing a routing engine 128 with switching logic.

However, if the notification (and work item) is not accepted by one or more resources 112, the method may return to a determination of whether to push the notification to one or more resources at step 216. In some scenarios, the contact may be directed to a work assignment (step 220), while in others the contact may be directed through the push notification analysis procedure (steps 224, 228, and 232). In any event, it is anticipated that the number of iterations that a notification is not accepted, may be recorded and used to alter the function of the process. For example, the number of iterations may be used to alter the rules determining one or more resources 112 and/or workflow. For instance, if a notification is not answered a first time, it may be run through the method a second time. But, the second iteration may incorporate new rules that may increase the number of resources 112 that are pushed notifications. This increase may include a wider selection of resources 112 based on other information related to the contact. In one embodiment, the work item may be queued (at step 232), especially if the work item was not previously queued, to increase the possibility of being accepted by at least one resource 112. Additionally, or alternatively, the work item may be assigned according to a traditional workflow, as described at step 220, if the number of iterations reaches a predetermined number.

Once the work item has been routed to at least one resource 112 (at step 240), notifications may still be pushed to one or more resources 112 to accommodate for scenarios where agent assistance may be required (step 244). In one embodiment, this determination may be initiated manually, via a resource 112 determining that assistance is required. In another embodiment, this determination may be initiated automatically, via the ACNG module 124 referring to resource 112 and/or contact rules that direct push notifications. For example, the ACNG module 124 may determine that an agent-in-training has accepted the work item. This agent-in-training may have a certain level of experience associated with handling specific work items. In this case, the ACNG module 124 may determine that the work item accepted by the agent-in-training requires the assistance of a subject matter expert ("SME") or experienced agent. Accordingly, the ACNG module 124 may cause the method 200 to proceed in pushing notifications to the appropriate resource(s) 112 by directing the method to repeat from step 212. The repeated method 200 may include new information added to the work item and/or notification relating to the type of resource(s) 112 required to assist the agent-in-training. This new information will be reviewed by the ACNG module in determining the correct resource(s) 112 to receive the push notification. In the event that the resource 112 does not require assistance, the method 200 may end (step 248).

Figure 3:
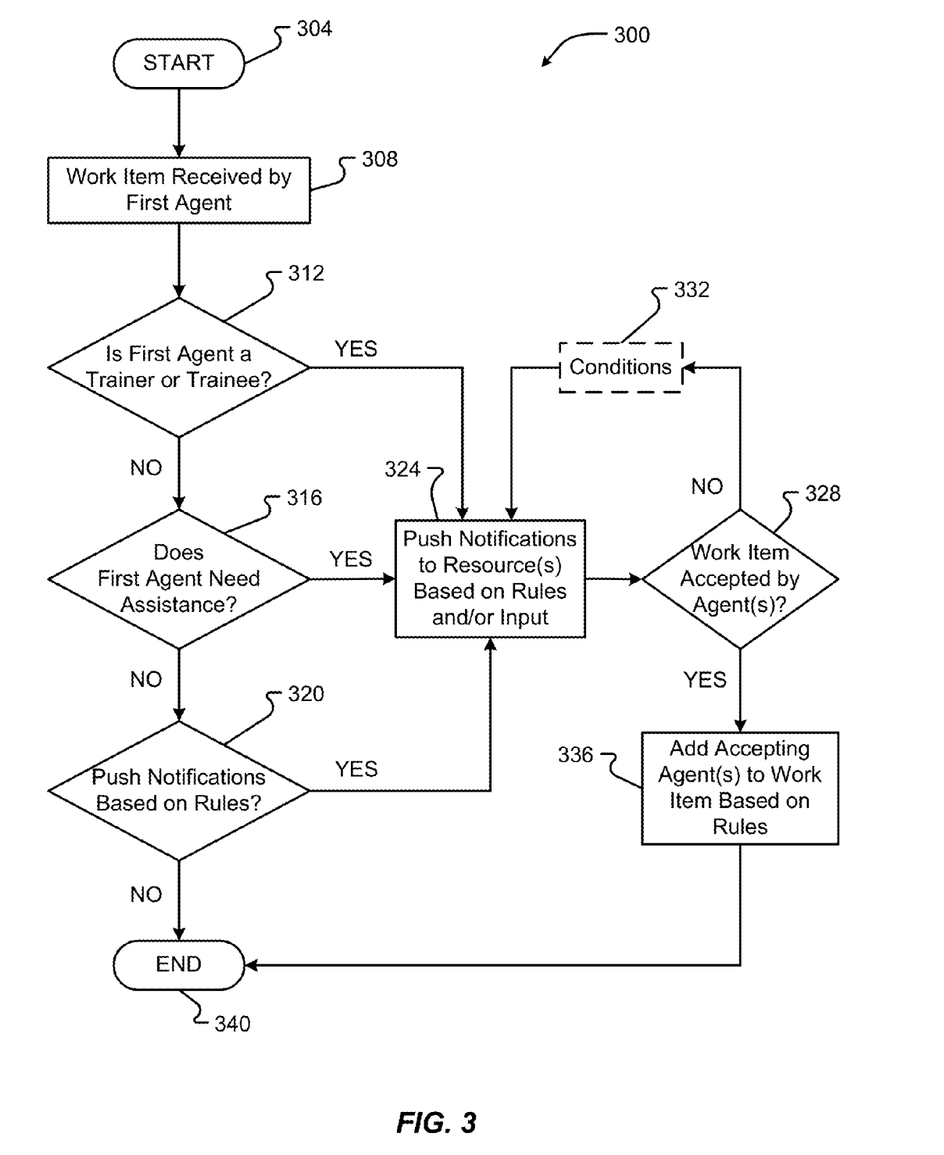
FIG. 3 is a second flow diagram depicting a method of automatically pushing call notifications in accordance with embodiments of the present disclosure.

FIG. 3 is a second flow diagram depicting a method 300 of automatically pushing call notifications in accordance with embodiments of the present disclosure. The method begins at step 304 and proceeds when a work item is received by a first resource (step 308). As presented in FIG. 3, the work item may be received by the first resource through any acceptable means including workflow assignment or via the first resource accepting a pushed notification (as disclosed in FIG. 2).

The method 300 continues by the ACNG module 124 determining whether the first resource is a trainee or trainer (step 312). It is an aspect of the present disclosure to provide a training mechanism by which agents-in-training may be paired with experienced agents in handling real work items. In some embodiments, the agent-in-training may be allowed to receive work items, and upon receipt of certain work items, the ACNG module 124 may determine to push notifications to trainer resources as outlined in step 324. In other embodiments, a trainer-agent may receive work items, and upon receipt of certain work items, the ACNG module 124 may determine to push notifications to trainee resources as outlined in step 324. Otherwise, the method 300 may continue by determining whether any other push notification triggers are satisfied (e.g., step 316 and/or step 320) and if not, end (step 340). In both cases, this determination may be initiated automatically via the ACNG module 124. It is one aspect of the present disclosure that the ACNG module 124 is configured to analyze the resource 112 handling the work item to determine whether the first resource is a trainee or trainer. Analyzing the resource 112 may involve reviewing information that may include, but is not limited to, an identifier, skill and attributes set, and the like associated with a resource 112.

In some embodiments, the ACNG module 124 may determine whether the first resource requires assistance (step 316). It is one aspect of the present disclosure that the ACNG module 124 is configured to analyze the work item and/or resource 112 handling the work item to determine whether the first resource may require assistance. In analyzing the work item and/or resource 112, the ACNG module 124 may refer to at least one of an identifier, skill and attributes set, subject matter type, urgency, that are associated with a work item and/or resource 112. For example, the ACNG module 124 may detect that the first resource receives a work item, where the work item is associated with a special technical area. It may be determined by the ACNG module 124 that the first resource has limited experience (e.g., less than 3 months) in the special technical area. Accordingly, the ACNG module 124 may determine that the combination of work item and resource 112 information requires that the first resource be assisted. In this case, the method 300 would continue, at step 324, by pushing notifications to one or more resources 112 based on rules. Otherwise, the method 300 may continue by determining whether any other push notification triggers are satisfied (e.g., step 312 and/or step 320) and if not, end (step 340).

In one embodiment, the ACNG module 124 may determine to create push notifications based on rules stored in memory (step 320). For example, rules may be used to push notifications to administrator resources and/or supervisors to monitor the first resource in handling one or more work items. Additionally, or alternatively, rules may be used by the ACNG module 124 to provide push notifications based on a contact's willingness to participate in a survey. As such, the notifications may be pushed to at least one survey group. Other rules may be generated to account for contact center state, staffing levels, work item demand, and the like. If the rules are satisfied in the positive, the method 300 proceeds by pushing notifications to the appropriate one or more resources 112 determined in step 324. Otherwise, the method 300 may continue by determining whether any other push notification triggers are satisfied (e.g., step 312 and/or step 320) and if not, end (step 340).

Similar to steps 224 and 228 disclosed in FIG. 2, notifications may be pushed to one or more resources 112 based on rules and/or input provided (step 324). As can be appreciated, the operation of the ACNG module 124 and associated components in pushing notifications to one or more resources 112 previously disclosed may at least apply to pushing notifications as disclosed with regard to method 300. Additionally, or alternatively, the method 300 may utilize input provided from the resource, customer, work item, ACNG module 124, supervisor, and/or administrator in determining one or more appropriate resources 112 to push notifications.

The method 300 continues by detecting whether the notification and work item have been accepted by one or more agents/resources 112 (step 328). In particular, the present disclosure describes that a notification of an available work item is pushed to one or more resources 112. In some embodiments, the one or more resources 112 may comprise a number of groups. These one or more resources 112 may accept the contact for handling by accepting the pushed notification. This process may involve a resource 112 accepting the notification as disclosed herein. If the notification is accepted by one or more resources 112 the method 300 may continue at step 336. Conversely, if the notification is not accepted by at least one resource 112, the method may continue at optional step 332 and/or return to pushing notifications to one or more resources 112 at step 324.

Step 332 may include monitoring/altering the iterations of a notification when not accepted by at least one resource 112. In general, conditions may be applied to the process that may include but is not limited to the inclusion of timers, counters, overrides, and the like. The timer may be initiated to determine the length of a time a notification has not been accepted or handled by at least one resource 112. Counters may be used to count the number of time a notification is not accepted in a given time period. Overrides may be implemented to account for contact center condition changes, contacts who terminate their work item, customer input, supervisor control and the like. In any event, the conditions applied in optional step 332 may affect the process to, among other things, determine appropriate notification recipients, terminate work items, assign work via another method, and/or otherwise route work items.

In some embodiments, the method 300 continues when the work item is accepted by at least one resource by adding the accepting resource to the work item (step 336). At this point, the first resource may be removed from, or remain with, the work item. In cases where the first resource is removed, the accepting resource must remain with the work item until the work item is terminated or another resource is added to the work item. As can be appreciated, the accepting resource may determine to initiate a push notification if assistance is desired (e.g., proceeding from step 324). Once the method 300 is complete and the one or more resources are assigned to the work item, the method 300 may end (step 340).

Figure 4:
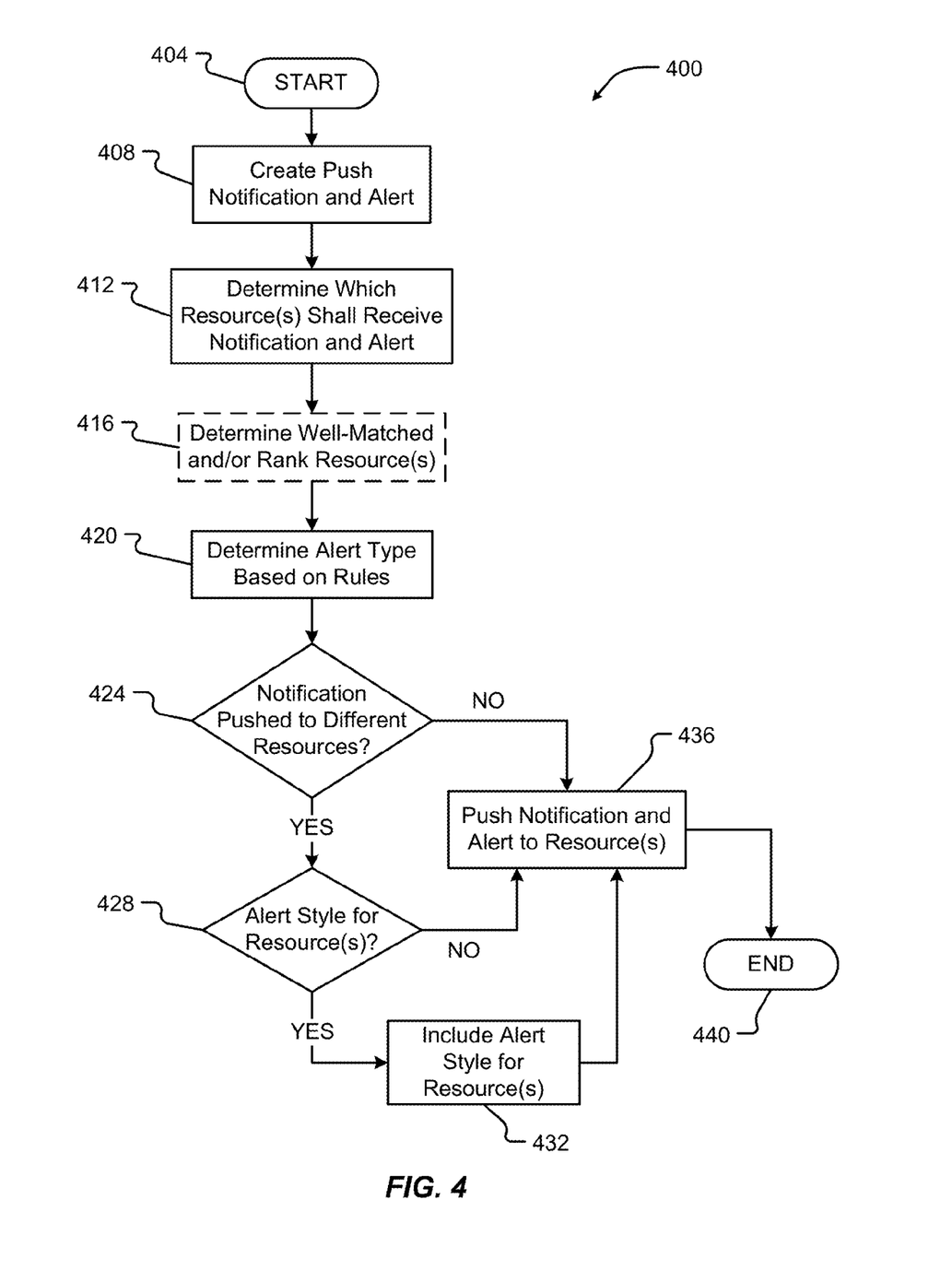
FIG. 4 is a third flow diagram depicting a method of automatically pushing call notifications in accordance with embodiments of the present disclosure.

FIG. 4 is a third flow diagram depicting a method 400 of automatically pushing call notifications in accordance with embodiments of the present disclosure. The method 400 begins at step 404 and proceeds when the ACNG module 124 determines that a push notification and alert are to be created (step 408). Next, the ACNG module 124 determines which resource(s) 112 shall receive the push notification and alert (step 412). This step is similar, if not identical, in operation as previously described in step 224 (FIG. 2) and step 324 (FIG. 3).

In one embodiment, the ACNG module 124 may rank, order, and/or arrange one or more resources 112 according to the resources' predicted ability to successfully handle the work item (step 416). This step may be described as ordering "well-matched" resources 112 from unorganized pools of resources 112. In general, a well-matched resource 112 has a better chance of successfully handling a work item than one that is unorganized. Determining one or more well-matched resources may involve comparing resource skills/attributes, among other things, with work item information, subject matter type, urgency, and the like associated with a contact. For example, a work item may be directed to SIP messaging, and the customer associated with the work item may be determined to be an expert in messaging. Accordingly, the ACNG module 124 may determine that well-matched resources should include expert level resources 112 who specialize in SIP messaging. One or more resources 112 that may not qualify as well-matched may include newly trained resources 112 who specialize in SIP messaging, or experts in other SIP fields unrelated to messaging.

Push notifications may be sent to both one or more well-matched resources 112 and one or more unorganized resources 112. It is an aspect of the present disclosure to have the ability to alter the notification and/or alert, such that each receiving resource 112 may receive a different notification and/or alert (step 420). It should be noted that the same notification and/or alert may be sent to all resources 112 as default. However, one or more well-matched resources 112 may receive some indication that the work item is especially suited for their abilities. For instance, a description may state that the work item is well-matched. Additionally, or alternatively, a displayed notification may illuminate to indicate well-matched. As can be expected, one or more non-well-matched resources 112 may receive standard notifications and/or alerts. It is anticipated that varying levels of well-matched and unorganized resources 112 may determine varying levels of alert indicating the same.

In one embodiment, the method 400 may determine that the notification is pushed to different resources 112 (step 424). Once this has been determined the ACNG module 124 may determine whether an alert style should be used for one or more specific resources (step 428) or to push the notification and alert to one or more resources 112 (step 436). In the event that a different alert style is to be used for one or more resources 112, the method 400 proceeds at step 432 by selecting an appropriate alert to include for the specific one or more resources 112 determined in step 428. Once included, the method 400 continues by pushing the notification and alert to the appropriate one or more resources 112 (step 436). The method 400 ends at step 440.

Figure 5A:
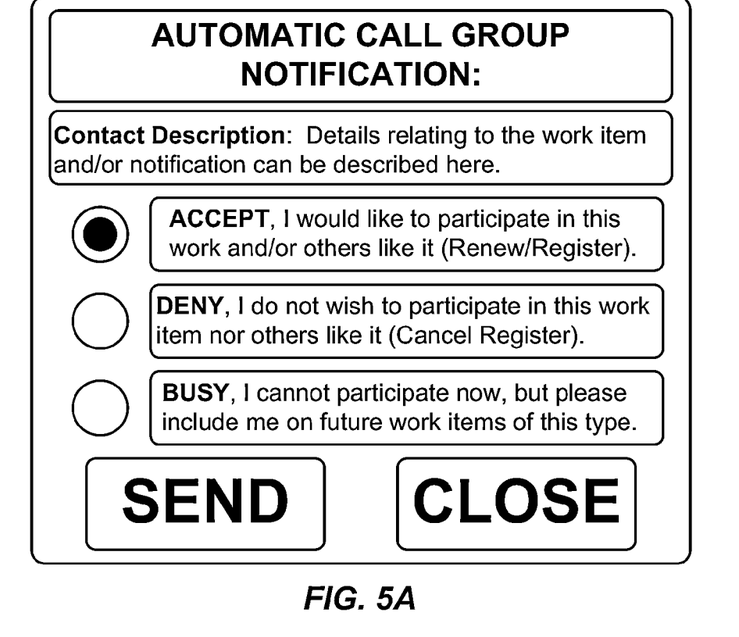
FIG. 5A depicts a notification alert in accordance with an embodiment of the present disclosure

Referring now to FIG. 5A a sample notification of an automatic call group notification is shown in accordance with embodiments of the present disclosure. In some embodiments the notification may contain at least one of a response mechanism, an alert feature, a registration feature, an interactive mechanism, descriptive feature, and the like. The behavior of a received notification may follow rules determining the position of display, window size, display colors, and dynamic features. For example, the notification may be configured to flash, change colors, always stay on top of other windows, and/or incorporate other features designed to illicit a response. Other embodiments may also employ the use of sound and/or tactile stimuli to also illicit a response from a resource 112.

Figure 5B:
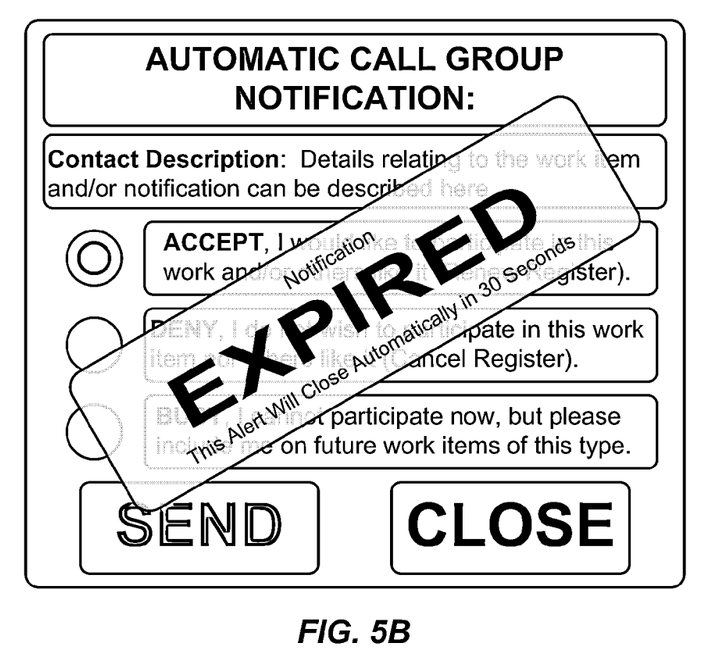
FIG. 5B depicts a notification alert in accordance with another embodiment of the present disclosure.

FIG. 5B shows a sample expired notification in accordance with embodiments of the present disclosure. As described above, notifications, alerts, and the like may expire, be rescinded, and/or update to relay new information. In some embodiments, this dynamic notification may include a timer to expire after a specific stimulus. In other embodiments, a notification may have been accepted by one or more resources 112, in which case other resources 112 may be notified through the mechanism of an expired notification alert. However, the notification of a lost or handled work item may be separate from the notification and/or alert.

Figure 6:
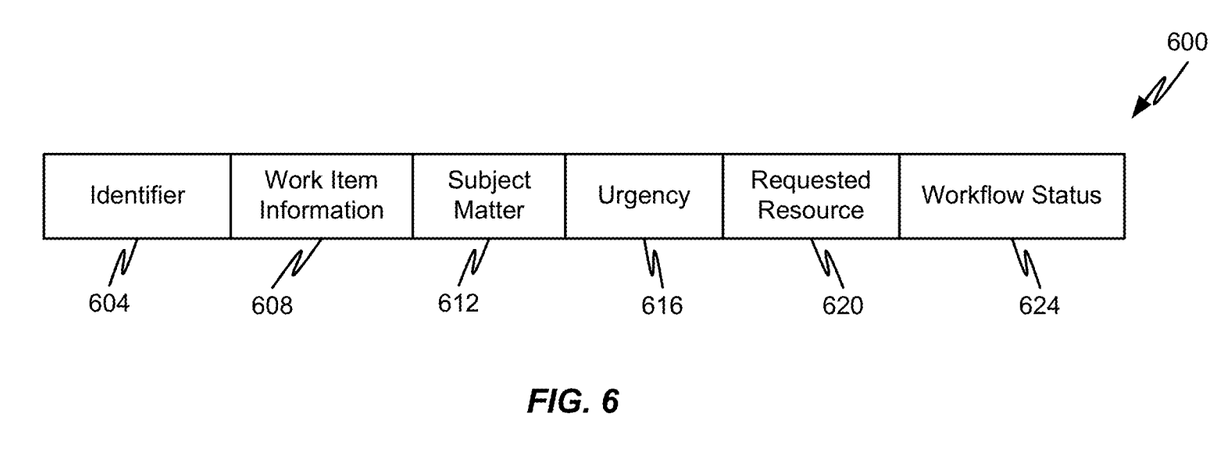
FIG. 6 is a block diagram depicting a data structure used in accordance with embodiments of the present disclosure.

FIG. 6 depicts a data structure used in accordance with embodiments of the present disclosure. Specifically, each work item, may have a corresponding data structure 600 which identifies the work item in an identifier information field 604, provides customer and work item related data in a work item information field 608, identifies the subject matter of the work item in a subject matter information field 612, identifies a prioritizing or ordering rank in an urgency information field 616, specifies one or more agents or resources 112 to handle the work item in a requested resource information field 620, and designates position of the work item in a contact center via a workflow status information field 624.

The identifier information field 604 may comprise data that identifies the work item media type. This field 604 may be used by the ACNG module 124 in directing work items to work assignment and/or pushing the work item to notification call groups (e.g., one or more resources 112). The identifier information field 604 may be used to track the work item while it is being processed through a contact center. Additionally, or alternatively, the identifier information field 604 may include data to track a work item in real-time, near-real-time, or non-real-time. For example, data relating to the handling of a work item may be evaluated after the work item has been handled (e.g., non-real-time) to provide information to improve handling techniques. Among other things the identifier information field 604 may comprise data that can be used to differentiate between various work items received by a call center.

The work item information field 608 may comprise data that identifies a customer associated with the work item. In some embodiments, the work item information field 608 may comprise one or more bits which describe whether the customer associated with the work item has paid for, or is assigned to, a quality level or grade. Among other things, the field 608 may be used to identify attributes of the work item including but not limited to technical ability, quality level, service grade (e.g., increasing in grade from lowest to highest, such as, bronze, silver, gold, platinum, etc.) and the like. For example a work item may be treated differently in routing and/or pushing to notification call groups if it is determined that the customer associated with the work item has paid for the best service levels (e.g., either gold or platinum) available. This information may be contained in the work item information field 608. Additionally, or alternatively, the work item information field 608 may include identification data relating to a specific customer that may be used by, at least, the ACNG module 124 in referring to stored data, preferences, and/or historical information relating to the customer.

The subject matter information field 612 may comprise one or more bits or bit values which identify the subject matter area that is used to appropriately route the work item. This field 612 may include general or specific information relating to the subject matter of the work item. For example, a sample work item may wish to inquire about implementing SIP presence functionality in an existing telecommunications system. As such, the subject matter information filed 612 may be coded to identify SIP presence and implementation as the appropriate subject matter to be used in routing and/or pushing the work item to notification groups.

The urgency information field 616 may be similar to the subject matter information field 612, in that it too can be used in determining appropriate routing of a work item. In some embodiments, the urgency information field 616 may describe whether a work item has been previously routed or transferred, designated as important, and/or otherwise categorized for importance. For example, if a work item has been designated as urgent, this field 616 would reflect that designation and route the work item according to rules designed to handle the work item before non-urgent contacts. Moreover, this field 616 may be used to push notifications to an urgent work item before one that is not designated as urgent. It is anticipated that varying levels of urgency may be employed to order work items (e.g., not urgent, somewhat urgent, urgent, very urgent, and extremely urgent, etc.).

The requested resource information field 620 may comprise data supplied by a contact in requesting a specific resource for handling. In other words, this field 620 may be used to route a work item to a resource who may be familiar with the work item, the subject matter, and/or the customer. In some embodiments, the customer may supply a specific resource identifier in the form of an agent number, resource name, and/or address. In other embodiments, the ACNG module 124 may refer to historical data associated with the work item and/or customer to retrieve requested resources previously set.

The workflow status information field 624 may comprise data as to the position of a work item in a contact center workflow. For instance, the field 624 may indicate whether the work item is at least one of received, assigned, queued, in process, pushed to notification call groups, terminated, handled, and otherwise disposed. In some embodiments, the ACNG module 124 may refer to the workflow status information field 624 to determine if a work item requires further routing and/or direction.

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   receiving a work item at a contact center;
   determining, by a processor, to push notification of the work item to at least one telephone communication device utilized by one or more resources, wherein the one or more resources are not required to register to receive the notification of the work item;
   prior to assigning the work item, pushing notification of the work item to the at least one telephone communication device utilized by the one or more resources, wherein the pushed notification of the work item is configured to cause the at least one telephone communication device to alert, and wherein the pushed notification is configured to allow at least one resource of the one or more resources to handle the work item by accepting the pushed notification; and
   routing the work item to the at least one resource based at least partially on the acceptance of the pushed notification.

2. The method of claim 1, wherein determining to push notification of the work item further comprises:
   analyzing the work item for resource-matching information; and
   selecting the one or more resources that at least partially matches the resource-matching information of the work item.

3. The method of claim 2, wherein the selection of the one or more resources further comprises:
   determining a rank for each resource in the one or more resources, wherein the rank is based on a percentage of matched resource-matching information between the work item and each resource in the one or more resources; and
   assigning a well-matched rank to at least a first resource in the one or more resources with the highest percentage of resource-matching information.

4. The method of claim 3, wherein the pushed notification is sent to the at least a first resource with a first alert, wherein the first alert is configured to indicate that the pushed notification relates to the well-matched rank.

5. The method of claim 1, wherein the one or more resources are not registered to receive work assignments from the contact center.

6. The method of claim 1, wherein pushing notification of the work item is at least partially based on presence associated with the one or more resources, and wherein the at least one telephone communication device is caused to alert via ringing.

7. The method of claim 1, wherein the work item is processed through a work assignment engine prior to being routed to the at least one resource.

8. The method of claim 1, wherein the pushed notification is configured to provide the one or more resources with options, the options comprising one or more of accepting, denying, and ignoring the pushed notification.

9. The method of claim 1, wherein after the work item is routed to the at least one resource, determining to push second notification of the contact to another telephone communication device utilized by at least one other resource.

10. The method of claim 9, wherein the work item is handled by the at least one resource and the at least one other resource, wherein the at least one other resource accepted the push second notification.

11. The method of claim 1, wherein determining to push notification of the work item further comprises:
    referring to a state associated with the contact center, wherein the state represents a condition of operation of the contact center; and adjusting a number of pushed notifications based on the state of the contact center.

12. The method of claim 1, further comprising:
determining the work item is routed to a first training resource of the at least one resource; and
routing the work item to a second training resource, wherein the second training resource may participate in handling the work item.

13. A non-transitory computer readable medium having stored thereon instructions that, when executed by a processor, perform a method comprising:
receiving a work item at a contact center;
determining, by a processor, to push notification of the work item to at least one telephone communication device utilized by one or more resources, wherein the one or more resources are not required to register to receive the notification of the work item;
prior to assigning the work item, pushing notification of the work item to the at least one telephone communication device utilized by the one or more resources, wherein the pushed notification of the work item is configured to cause the at least one telephone communication device to alert, and wherein the pushed notification is configured to allow at least one resource of the one or more resources to handle the work item by accepting the pushed notification; and
routing the work item to the at least one resource based at least partially on the acceptance of the pushed notification.

14. The non-transitory computer readable medium of claim 13, wherein the determining step of the method further comprises:
analyzing the work item for resource-matching information; and
selecting the one or more resources that at least partially matches the resource-matching information of the work item.

15. The non-transitory computer readable medium of claim 14, wherein the selection of the one or more resources further comprises:
determining a rank for each resource in the one or more resources, wherein the rank is based on a percentage of matched resource-matching information between the work item and each resource in the one or more resources; and
assigning a well-matched rank to at least a first resource in the one or more resources with the highest percentage of resource-matching information.

16. The non-transitory computer readable medium of claim 13, wherein the determining step of the method further comprises:
referring to a state associated with the contact center, wherein the state represents a condition of operation of the contact center; and
adjusting a number of pushed notifications based on the state of the contact center.

17. The non-transitory computer readable medium of claim 13, wherein the method further comprises:
determining the work item is routed to a first training resource of the at least one resource; and
routing the work item to a second training resource, wherein the second training resource may participate in handling the work item.

18. A contact center, comprising:
a memory;
a processor; and
a work assignment mechanism including:
a work assignment engine configured to compare attributes of work items in a work pool with attributes of resources in a resource pool and match the work items to resources based on the comparison of attributes; and
an automatic call notification groups module configured to determine, by the processor, to push notification of a received work item to at least one telephone communication device utilized by one or more resources, wherein the one or more resources are not required to register to receive the notification of the work item, and push notification of the work item to the at least one telephone communication device utilized by the one or more resources before assigning the work item, wherein the pushed notification of the work item is configured to cause the at least one telephone communication device to alert, and wherein the pushed notification is configured to allow at least one resource of the one or more resources to handle the work item by accepting the pushed notification.

19. The contact center of claim 18, further comprising:
a routing engine, wherein the routing engine is configured to route the work item to the at least one resource based at least partially on acceptance of the pushed notification by the at least one resource.

20. The contact center of claim 18, wherein the automatic call notification groups module is further configured to analyze the work item for resource-matching information, and select the one or more resources that at least partially matches the resource-matching information of the work item.

21. The method of claim 1, wherein the notification of the work item is pushed to the one or more resources based on a state or a busyness associated with the one or more resources.

* * * * *